Patented May 25, 1948

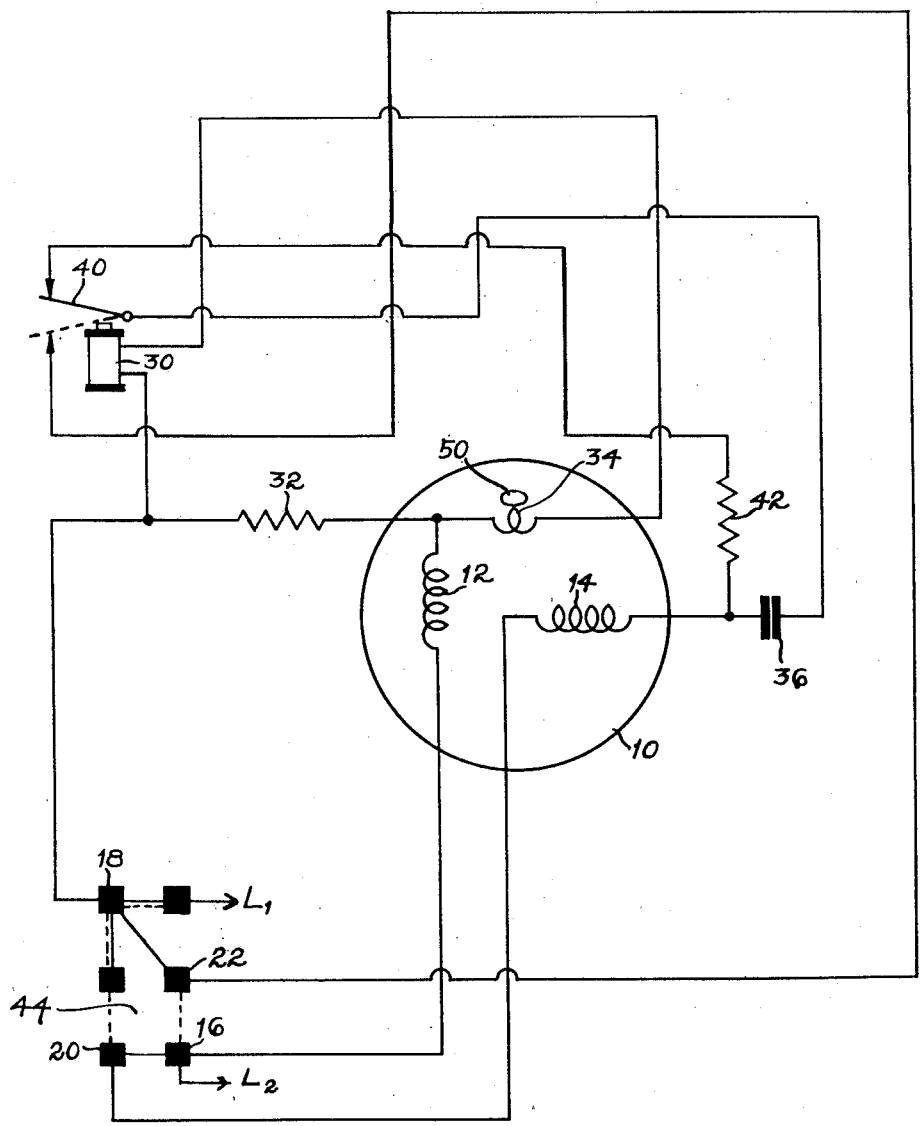

2,442,208

UNITED STATES PATENT OFFICE 2,442,208

REVERSING CONTROL FOR CAPACITOR MOTORS

Samuel Noodleman, Dayton, Ohio, assignor, by mesne assignments, to Worthington Pump and Machinery Corporation Application September 20, 1946, Serial No. 698,368

12 Claims. (Cl. 318—207)

This invention relates to an electromagnetic control device used in association with a reversible split phase motor.

This application is related to the disclosure in my copending application Serial No. 624,174 for Electromagnetic control, filed October 24, 1945.

An object of this invention is to provide an electromagnetic control device that is used in controlling the starter winding of a split phase motor, such that upon the current being interrupted through the motor the starter winding will be connected into the circuit, so that it first functions as a brake in arresting the rotation of the motor and this followed by the starter winding aiding the main winding in starting the rotor in the opposite direction.

Another object of this invention is to provide an electromagnetic control device that is in part energized from a winding linking the flux of the motor that is delayed in its action, so that in the event the switching operation should occur when the flux is at zero value, a sufficient delay results that permits the building up of certain voltage components during this delay period.

Another object of this invention is to provide an automatic switching mechanism that open-circuits the starter winding when the motor attains a predetermined speed, said automatic switching mechanism closing the circuit through the starter winding whenever the relative phase relation of the main and starter windings are reversed irrespective of the motor speed.

Another object of this invention is to provide a single phase motor that may be reversed by merely reversing the polarity of the windings with respect to each other to thereby cause a reversal of the motor.

Other objects and advantages reside in the construction of parts, the combination thereof and the mode of operation, as will become more apparent from the following description.

The single figure in the drawings discloses a wiring diagram of the electrical circuit used in the reversible single phase motor starting as a split phase motor.

In my copending application two voltage vectors are impressed upon the terminals of an electromagnetic relay. The same principle is incorporated in the device disclosed herein, it being modified to take care of changed conditions.

In using electric motors for hoists and elsewhere where it is desirable to instantly reverse the motor, it is desirable to use A. C. current and at the same time produce a motor that may be reversed by a single switching operation. This has been accomplished by the use of the arrangement disclosed in the drawings, wherein the motor 10 is provided with a main field winding 12 and a phase or starter winding 14. The windings 12 and 14 may be conventional field windings. The winding 12 has its terminals 16 and 18 terminating on the outside of the motor. The split phase winding 14 has its terminals 20 and 22 also located outside of the motor, so that by reversing the relative direction of the voltages applied to the windings 12 and 14, the direction of the rotor is thereby reversed.

In order to efficiently operate the motor, it is desirable after the motor has started and accelerated to a predetermined speed to open-circuit the starter winding or phase winding 14. This has been accomplished by the use of a relay 30, having impressed upon its terminals two voltage vectors, one of which is a voltage drop across the resistance 32 connected in series with the main winding 12 and the voltage vector generated in the winding 34 linking a portion of the stator. The winding 34 is positioned to link the flux generated by the main field winding 12. The resultant voltage applied to the relay 30 is the vector sum of the voltage vector across the resistance 32 and the voltage generated in the pick-up winding 34. The operation of the relay 30 in open-circuiting the phase winding 14 has been more fully described in my copending application Serial No. 624,174. In starting the motor, the phase winding 14 is connected to the source of electrical energy through a condenser or capacitator 36. When the switch 40 is in the full line position shown in the single figure, a resistor 42 is connected in series across the terminals of the condenser 36, so as to discharge the condenser. Thus, the condenser, when connected into the phase winding, has a zero potential across its terminal.

*Mode of operation*

When the circuit is closed across the main field winding 12, by interconnecting the outlets 18 and 22 into the input lines, a heavy current flows through the resistance 32 energizing the electromagnet 30, so as to actuate the switch 40 from the full line position to the dot-dash position, thereby connecting the phase winding 14 in series with the condenser 36 in parallel with the main phase winding 12. The condenser 36 results in a leading current flowing through the winding 14, thereby providing in effect two phases acting upon the rotor, as is well known to those skilled in the art. This causes the rotor to rotate in one or another direction, depending upon the relative direction of current flowing through the windings 12 and 14.

As soon as flux is generated in the rotor, the pick-up coil 34 generates a voltage that is out of phase with the voltage generated in the resistance 32. It is the resultant of this voltage that energizes the relay 30. As the rotor accelerates, the current through the winding 32 decreases and the voltage generated by the coil 34 increases to a point where the resultant voltage is insufficient to hold the switch 40 in the dotted position, thereby permitting the switch 40 to move from the dotted position into the full line position. When in the full line position, the winding 14 is open-circuited and a resistance 42 is connected across the terminal of the condenser 36. The motor then continues to rotate as a single phase motor.

If the switching mechanism 44 is opened momentarily and then closed in such a manner that the voltage is reversed, either to the winding 14 or to the winding 12, but not reversed as to both windings, there usually is a surge of current through the resistance 32, causing the relay 30 to shift the switch 40 from the full line position to the dot-dash position, thereby energizing the phase winding 14. If the phase winding is energized, it will first function as a brake, causing the rotor to come to a sudden stop. Then the winding 14 cooperates with the winding 12 to start the motor in the reverse direction.

On rare occasions when open-circuiting the windings and then closing the switch, nothing happens as far as the relay 30 and the switch 40 are concerned. This probably occurs when the switch happens to be closed at the instant when there is no current flowing through the main field winding. In other words, if the rotor rotated above the speed required to normally actuate the relay 30, the resultant voltage from the pick-up winding and the resistance is too small to actuate the relay 30. When this occurs, the winding 14 would not be energized and the motor would continue to operate on the main winding.

In order to take care of such a contingency, a short-circuited winding 50 functions to delay the pick-up coil generating a voltage vector sufficient to impart a neutralizing effect to the voltage drop across the resistance 32, so that this delay, caused by the short-circuited winding 50, results in the relay 30 being energized by the voltage drop across the resistance 32 to actuate the switch from the full line position to the dotted position. This causes the phase winding 14 to be connected across the terminals; but the relative voltage phase relation between the windings 12 and 14 has been reversed from that used in originally starting the motor. As a result thereof, the two fluxes supplied to the rotor function to buck the rotation of the rotor, thereby effectively applying a brake to the rotor, causing the rotor to came to a sudden stop and when it does, the fluxes acting upon the rotor cause the rotor to reverse its direction of rotation and start from zero position in the reverse direction.

Both windings 12 and 14 continue to energize the motor until the voltage vector that is the resultant of the voltage drop across the resistance 32 and the pick-up winding 34 drops below the holding voltage that is sufficient to hold the switch 40 in the dotted position, thereby permitting the switch 40 to advance from the dotted position to the full line position. The rotor then continues to rotate in the opposite direction until the switch 40 is again actuated, when it either comes to a stop or is reversed in the event the switch is closed, so as to again reverse the relative phase of the voltages supplied to the windings 12 and 14.

For some purposes the short circuited winding 50 is not essential. If, for example, the motor is used intermittently, first in one direction and later in the same direction or in a reversed direction, but in all cases the motor is allowed to come to a stop before the voltage of one of the windings is reversed, there is no necessity for using a short circuited winding, in that the relay mechanism will function first to close the circuit through the phase winding when starting the motor, and later to open-circuit the phase winding when the motor attains speed. It is only when it is absolutely essential to have a switching mechanism that is dependable, even though the voltage supplied to one of the windings is reversed when the motor is in motion, that the short circuited winding is needed.

Contacts 16, 18, 20 and 22 and the unnumbered contacts in the switch 44 are connected as indicated by the full lines when driven in one direction and by the dotted lines when the motor rotates in the opposite direction. Any other suitable switching mechanism could be used within the purview of this invention. The switching mechanism is so arranged that the circuit through the motor winding is interrupted whenever the relative direction of the current through the fields is reversed. In order that the reversing relay shall operate properly, it is necessary to open the circuit through the main winding at least momentarily. Otherwise, if the polarity of the phase winding is reversed with respect to the main field winding while the motor is running, nothing would take place, for the reason that the motor would continue to operate at full speed without the relay effecting a reversal.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A reversing mechanism for a split phase motor provided with a main field winding and a phase winding and including a mechanism for reversing the polarity of one of the windings, said reversing mechanism including voltage responsive relay means for open-circuiting the phase winding, said relay means including an electromagnet, a resistance in series with the main field winding, a pick-up coil linking the flux of a portion of the motor, and means for impressing the resultant voltage vector of the voltage drop across the resistance and the voltage generated in the pick-up coil upon the terminals of the relay to open-circuit the phase winding when the rotor approaches running speed.

2. A reversing mechanism for a split phase motor provided with a main field winding and a phase winding and including switching means for reversing the polarity of one of the windings, said reversing mechanism including a resistance element connected in series to one of the input lines of the motor, a pick-up coil having one terminal connected between the resistance and the main field winding of the motor, and an electromagnetic switch including an electromagnetic coil having one terminal connected in series with the pick-up coil and the other terminal connected to the input line having the resistance so that the pick-up coil and the coil of the electromagnetic switch are connected in series with each other and in parallel to the resistance whereby the voltage supplied to the terminals of the coil of the electromagnetic switch is the resultant of the voltage drop across the resistance and the voltage generated in the pick-up coil.

3. A reversing mechanism for a split phase motor provided with a main field winding and a phase winding and including switching means for reversing the polarity of one of the windings, said reversing mechanism including means for causing a voltage drop in phase with the current flowing through the main field winding, a pick-up coil linking a portion of the stator for generating a voltage proportional to the rotor speed as well as the main and phase currents, and an electromagnetic switch having an electromagnetic coil energized by a voltage that is the resultant of the voltage drop across said first means and the voltage generated in said pick-up coil, said electromagnetic switch being actuated when predetermined conditions exist in the motor.

4. A reversing mechanism for a split phase motor provided with a main field winding and a phase winding, and including switching means for reversing the polarity of one of the windings, said reversing mechanism including means for causing a voltage drop in phase with the current flowing through one of the motor windings, a pick-up coil linking a portion of the stator for generating a voltage that has a phase displacement influenced by the phase displacement of the current flowing through the motor windings, and an electromagnetic switch having an electromagnetic coil energized by a voltage that is the resultant of the voltage drop across said means and the voltage generated in said pick-up coil, said electromagnetic switch being actuated when predetermined conditions exist in the motor.

5. A reversing mechanism for a split phase motor provided with a main field winding and a phase winding and including a mechanism for reversing the polarity of one of the windings, said reversing mechanism including an electromagnetic switch having an electromagnetic coil, and means for energizing said electromagnetic coil, said means supplying a voltage vector to the electromagnetic coil that is the resultant of a voltage in phase with the input current and a second voltage that is influenced by the phase displacement of the currents flowing through the windings of the motor and the speed of the rotor.

6. A reversing mechanism for a split phase motor provided with a main field winding and a phase winding and including switching means for reversing the polarity of one of the windings, said reversing mechanism including means for causing a voltage drop in phase with the current flowing through at least one of the motor windings, a pick-up coil linking a portion of the stator for generating a voltage that is influenced by the phase displacement of the currents flowing through the windings of the motor and the speed of the rotor, and switching means energized by a voltage that is the resultant of the voltage drop in phase with the current flowing through at least one of the motor windings and the voltage generated by the pick-up coil, said switching means being actuated when predetermined conditions exist in the motor.

7. A reversing mechanism for a split phase motor provided with a main field winding and a phase winding and including a mechanism for reversing the polarity of one of the windings, said reversing mechanism including voltage responsive relay means for open-circuiting the phase winding, said relay means including an electromagnet, a resistance in series with the main field winding, a pick-up coil linking the flux of a portion of the motor, a short circuited coil linking at least some of the flux linking the pick-up coil to cause a delay in the effectiveness of the pick-up coil, and means for impressing the resultant voltage vector of the voltage drop across the resistance and the voltage generated in the pick-up coil upon the terminals of the relay to open-circuit the phase winding when the rotor approaches running speed.

8. A reversing mechanism for a split phase motor provided with a main field winding and a phase winding and including switching means for reversing the polarity of one of the windings, said reversing mechanism including a resistance element connected in series to one of the input lines of the motor, a pick-up coil having one terminal connected between the resistance and the main field winding of the motor, a short circuited coil linking at least some of the flux linking the pick-up coil to cause a delay in the effectiveness of the pick-up coil, and an electromagnetic switch including an electromagnetic coil having one terminal connected in series with the pick-up coil and the other terminal connected to the input line having the resistance so that the pick-up coil and the coil of the electromagnetic switch are connected in series with each other and in parallel to the resistance whereby the voltage supplied to the terminals of the coil of the electromagnetic switch is the resultant of the voltage drop across the resistance and the voltage generated in the pick-up coil.

9. A reversing mechanism for a split phase motor provided with a main field winding and a phase winding and including switching means for reversing the polarity of one of the windings, said reversing mechanism including means for causing a voltage drop in phase with the current flowing through the main field winding, a pick-up coil linking a portion of the stator for generating a voltage proportional to the rotor speed as well as the main and phase currents, a short circuited coil linking at least some of the flux linking the pick-up coil to cause a delay in the effectiveness of the pick-up coil, and an electromagnetic switch having an electromagnetic coil energized by a voltage that is the resultant of the voltage drop across said first means and the voltage generated in said pick-up coil, said electromagnetic switch being actuated when predetermined conditions exist in the motor.

10. A reversing mechanism for a split phase motor provided with a main field winding and a phase winding, and including switching means for reversing the polarity of the main field winding, said reversing mechanism including means for causing a voltage drop in phase with the current flowing through one of the motor windings, a pick-up coil linking a portion of the stator for generating a voltage that has a phase displacement influenced by the phase displacement of the current flowing through the motor windings, means for causing a time delay in the effective operation of the pick-up coil after operation of the switching means for reversing the current through the main field winding, and an electromagnetic switch having an electromagnetic coil energized by a voltage that is the resultant of the voltage drop across said means and the voltage generated in said pick-up coil, said electromagnetic switch being actuated when predetermined conditions exist in the motor.

11. A reversing mechanism for a split phase motor provided with a main field winding and a phase winding and including a mechanism for reversing the polarity of the main field winding, said reversing mechanism including an electromagnetic switch having an electromagnetic coil, and means for energizing said electromagnetic coil, said means supplying a voltage vector to the electromagnetic coil that is the resultant of a voltage in phase with the input current and a second voltage that is influenced by the phase displacement of the currents flowing through the windings of the motor and the speed of the rotor, and time delay means deterring the effectiveness of the second voltage after the polarity of the main winding has been reversed.

12. A reversing mechanism for a split phase motor provided with a main field winding and a phase winding and including switching means for reversing the polarity of the main field winding, said reversing mechanism including means for causing a voltage drop in phase with the current flowing through at least one of the motor windings, a pick-up coil linking a portion of the stator for generating a voltage that is influenced by the phase displacement of the currents flowing through the windings of the motor and the speed of the rotor, switching means energized by a voltage that is the resultant of the voltage drop in phase with the current flowing through at least one of the motor windings and the voltage generated by the pick-up coil, said switching means being actuated when predetermined conditions exist in the motor, and time delay means for delaying the effectiveness of the pick-up coil after the polarity through the main field winding has been reversed with respect to the polarity of the phase winding.

SAMUEL NOODLEMAN.

REFERENCES CITED

The following references are of record in the file of this patent:

UNITED STATES PATENTS

| Number | Name | Date |
|---|---|---|
| 1,991,035 | Werner | Feb. 12, 1935 |
| 2,300,708 | Sleeter | Nov. 3, 1942 |
| 2,388,382 | Brongersma | Nov. 6, 1945 |
| 2,407,117 | Warner | Sept. 3, 1946 |
| 2,407,994 | Menzies | Sept. 24, 1946 |